Patented May 16, 1950

2,507,509

UNITED STATES PATENT OFFICE 2,507,509

PREPARATION OF TRIMESATES

Marian F. Fegley, Mont Clare, and Willard J. Croxall, Bryn Athyn, Pa., assignors to Rohm & Haas Company, Philadelphia, Pa., a corporation of Delaware No Drawing. Application March 15, 1949, Serial No. 81,628

5 Claims. (Cl. 260—475)

This invention deals with a method for the preparation of trialkyl trimesates

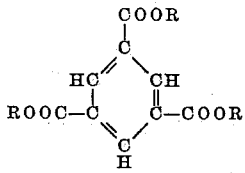

where R is a lower alkyl group.

These compounds are prepared by heating an alkyl beta-alkoxyacrylate with a quaternary ammonium alcoholate as catalyst. Heating is preferably done at 40° to 60° C. and under reduced pressure until alcohol is no longer readily evolved. The catalyst is then removed and the trimesate separated.

The catalyst is conveniently destroyed by neutralization with an acid such as dilute sulfuric, hydrochloric, or acetic. The organic material is then washed, dried, and stripped of volatile material, usually by distillation under reduced pressure. The trimesates are obtained as crystalline products when the alkyl groups are small. As these groups increase in size, oily materials are obtained. The limitation as to size of alkyl group here depends upon the ease of stripping off the alcohol formed therefrom.

The alkyl beta-alkoxyacrylates of particular interest as starting materials are represented by methyl beta-methoxyacrylate, ethyl beta-ethoxyacrylate, propyl beta-propoxyacrylate, isopropyl beta-isopropoxyacrylate, butyl beta-butoxyacrylate, and the like. These ether esters are available through the reaction of acetylene and dialkyl carbonates in the presence of anhydrous strongly basic catalysts, such as alkali metal acetylides, alkali metal alcoholates, and quaternary ammonium alcoholates, as described in application Serial No. 52,607, filed by Croxall and Schneider on October 2, 1948.

A carbonate such as dimethyl carbonate, diethyl carbonate, dipropyl carbonate, diisopropyl carbonate, dibutyl carbonate, diisobutyl carbonate, di-sec.-butyl carbonate, or the like, the alkyl groups being non-tertiary; i. e., primary or secondary, is treated with 0.01% to 5% of its weight of an alkaline catalyst and acetylene is passed into this mixture at 20° to 110° C. The catalyst is destroyed and the products separated by distillation under reduced pressure. There are obtained alkyl beta,beta-dialkoxypropionate, alkyl beta-alkoxyacrylate, and also dialkyl ether succinate and maleate in lesser amounts.

The alkyl beta,beta-dialkoxypropionates are converted to alkyl beta-alkoxyacrylates when heated with a dealcoholating catalyst which may be an acidic or an alkaline catalyst and a mole of alcohol taken off per mole of propionate. This convenient way of preparing beta-alkoxyacrylates is described in U. S. Patent application Serial No. 52,608, filed by Croxall and Schneider on October 2, 1948.

The above procedures will be illustrated with an example of the preparation of ethyl beta-ethoxyacrylate. A five-liter flask, equipped with a gas-tight, stainless steel stirrer, was charged with 300 cc. of anhydrous alcohol denatured according to Formula 2B. With stirring there was dissolved therein 29 grams of sodium. Excess ethanol was removed under reduced pressure, leaving sodium ethoxide as a dry powder. Thereto was added 2213 grams of anhydrous diethyl carbonate. The flask was then equipped with gas inlet and outlet tubes and flushed with nitrogen. The mixture was heated to 80°–85° C. and acetylene, drawn from a commercial cylinder, scrubbed with water and then with sulfuric acid, and dried over soda-lime, was passed in at a pressure of 9–10 inches of mercury. When absorption of acetylene became slow, the batch was cooled and acidified with dilute acetic acid. Two layers developed. The upper layer was separated, extracted with water, dried, and distilled. After a forerun of ethyl alcohol and ethyl carbonate two fractions, (a) and (b), containing both ethyl beta-ethoxyacrylate and ethyl beta,beta-diethoxypropionate were obtained. Redistillation of either of these would yield the separate esters. At 94° C./16 mm. a fraction of pure ethyl beta,-beta-diethoxypropionate was obtained. Higher boiling fractions yielded diethyl alpha,alpha-diethoxy-succinate. A portion of the early fractions was heated with sodium acid sulfate as a dealcoholating catalyst. From 96 grams of fraction (a) there were obtained at 102.5°–103° C./34 mm. 62 grams of ethyl beta-ethoxyacrylate. In the same way other alkyl beta-alkoxyacrylates are readily prepared. In place of the acidic dealcoholating catalyst, an alkaline catalyst may be used and a mole of alcohol taken off per mole of diether propionate to yield a beta-ether acrylate and this step may constitute one toward the preparation of the trialkyl trimesates from a diether propionate.

The particular catalysts used in this invention for effecting the change from an alkyl beta-alkoxyacrylate, an aliphatic compound, to a trialkyl trimesate, an aromatic compound, are strongly basic quaternary ammonium alkoxides, the ammonium group of which is capable of forming a quaternary ammonium hydroxide. Typical of quaternary ammonium alkoxides which may be used are benzyl trimethyl ammonium methoxide, benzyl trimethyl ammonium ethoxide, dibenzyl dimethyl ammonium methoxide, ethoxide, propoxide, or tert.-butoxide, tetramethyl ammonium methoxide, dimethyl di(chlorobenzyl) ammonium methoxide, dimethyl di(methylbenzyl) ammonium ethoxide, trimethyl diisopropylbenzyl ammonium methoxide or propoxide, etc. It is preferred that the alcoholate group be derived from an aliphatic monohydric alcohol of less than four carbon atoms.

Further details of procedure for preparing trialkyl trimesates are given in the following illustrative examples.

Example 1

A 44% solution of benzyl trimethyl ammonium methoxide in methanol was placed in a reaction vessel and the excess methanol from 170 grams of the solution was removed at 40° C. under reduced pressure to leave 88 grams of the quaternary ammonium methoxide with one mole of alcohol of solvation. Thereto was added 186 grams of methyl beta-methoxyacrylate. The temperature was held at 40°-44° C. A packed column with a partial take-off distilling head was attached to the reaction vessel and methanol was distilled at 45° C. under reduced pressure. The distillate was collected in a trap chilled with Dry Ice and acetone. During the course of seven hours 40 grams of methanol was collected. The reaction mixture was then neutralized with 104 grams of 24% acetic acid solution, washed with water, and dried over anhydrous sodium sulfate. The dried liquid was warmed under reduced pressure to drive off a small amount of methanol and then cooled. Trimethyl trimesate separated in the form of crystals which melted at 143°-144° C.

Example 2

A 35% solution of benzyl trimethyl ammonium ethoxide in ethanol was placed in a reaction vessel and heated at 40° under reduced pressure. From 163 grams of solution there was obtained 71 grams of benzyl trimethyl ammonium ethoxide monoethylate. Thereto, with cooling to hold the temperature at 40°-44° C., there was added 170 grams of ethyl beta-ethoxyacrylate. The temperature was maintained at about 45° C. while volatile material was distilled through a packed volumn under reduced pressure. Pressure was finally carried as low as 2 mm. during the course of 5.5 hours. A distillate of 43 grams was collected.

The reaction mixture was neutralized with dilute acetic acid, washed with water, and dried over sodium sulfate. The dried reaction mixture was heated and at 76°-79° C. there was taken off 8.5 grams of ethanol. The mixture was cooled; triethyl trimesate separated in crystalline form and was filtered off in an amount of 39 grams. The filtrate was fractionated to yield ethyl beta-ethoxyacrylate and ethyl beta,beta-diethoxypropionate. From the residue additional triethyl trimesate crystallized. The crude crystals were dissolved in ethanol and recrystallized therefrom. The product then melted at 135°-136° C. and corresponded in composition with triethyl trimesate.

In the same way butyl beta-butoxyacrylate heated at 50° to 60° C. with dibenzyl dimethyl ammonium ethoxide was decomposed with evolution of butyl alcohol, which was taken off under reduced pressure. Tributyl trimesate was formed. The product was distilled at 170°-183° C./0.15 mm. to give a fraction corresponding in chemical composition to tributyl trimesate.

We claim:

1. A process for preparing a trialkyl trimesate which comprises heating an alkyl beta-alkoxyacrylate, in which the alkyl groups are non-tertiary and contain one to four carbon atoms each, with a strongly basic quaternary ammonium alcoholate in which the alcoholate group is derived from an aliphatic monohydric alcohol of less than four carbon atoms and separating an alcohol from the reaction mixture.

2. A process for preparing trimethyl trimesate which comprises heating at 40° to 60° C. under reduced pressure methyl beta-methoxyacrylate in the presence of a quaternary ammonium alcoholate, as catalyst, in which the alcoholate group is derived from an aliphatic monohydric alcohol of less than four carbon atoms and separating methanol from the reaction mixture.

3. The process of claim 2 in which benzyl trimethyl ammonium methoxide is the catalyst.

4. A process for preparing triethyl trimesate which comprises heating at 40° to 60° C. under reduced pressure ethyl beta-ethoxyacrylate in the presence of a quaternary ammonium alcoholate, as catalyst, in which the alcoholate group is derived from an aliphatic monohydric alcohol of less than four carbon atoms and separating ethanol from the reaction mixture.

5. The process of claim 4 in which the catalyst is benzyl trimethyl ammonium ethoxide.

MARIAN F. FEGLEY.
WILLARD J. CROXALL.

No references cited.